United States Patent [19]

Chang

[11] Patent Number: 5,448,447
[45] Date of Patent: Sep. 5, 1995

[54] PROCESS FOR MAKING AN IMPROVED TANTALUM POWDER AND HIGH CAPACITANCE LOW LEAKAGE ELECTRODE MADE THEREFROM

[75] Inventor: Hongju Chang, Wayne, Pa.

[73] Assignee: Cabot Corporation, Boston, Mass.

[21] Appl. No.: 52,876

[22] Filed: Apr. 26, 1993

[51] Int. Cl.⁶ .......................... H01G 9/052; H01G 9/15
[52] U.S. Cl. ........................................ 361/529; 419/30
[58] Field of Search ................ 361/528, 529; 29/25.03; 252/402, 512, 518; 419/10, 13, 19, 30, 31, 34; 75/252, 255, 531; 427/79, 80

[56] References Cited

U.S. PATENT DOCUMENTS

| | | | |
|---|---|---|---|
| 3,427,132 | 2/1969 | Goon | 23/204 |
| 3,825,802 | 7/1974 | Kumagai et al. | 317/230 |
| 3,984,208 | 10/1976 | Moulin et al. | 29/182 |
| 4,154,609 | 5/1979 | Hähn | 75/252 |
| 4,423,004 | 12/1983 | Ross | 419/35 |
| 4,483,819 | 11/1984 | Albrecht et al. | 419/2 |
| 4,544,403 | 10/1985 | Schiele et al. | 75/0.5 |

FOREIGN PATENT DOCUMENTS 49254  5/1978 Japan.
86509  4/1988 Japan.

*Primary Examiner*—Bruce A. Reynolds
*Assistant Examiner*—Michael D. Switzer

[57] ABSTRACT

A process for producing capacitor grade powder, electrodes, and finished capacitors therefrom having reduced electrical leakage characteristics. The powder is prepared by reacting Group V-B base materials with quantities of between 500 to 7000 ppm of nitrogen and 700 to 3000 ppm of oxygen. Electrical leakage is reduced by at least 28% for electrodes anodized at 100 volts or greater in comparison with electrodes and finished capacitors made from undoped materials. A range of specific charge of up to 25,000 uFV/g is achieved for sintering temperatures of 1400° C. to 1800° C.

38 Claims, 2 Drawing Sheets

PROCESS FOR MAKING AN IMPROVED TANTALUM POWDER AND HIGH CAPACITANCE LOW LEAKAGE ELECTRODE MADE THEREFROM

FIELD OF THE INVENTION

This invention relates to a process for producing capacitor grade powder from a base material selected from Group V-B of the Periodic Table which has been reacted with nitrogen and oxygen; the powder produced therefrom; and a solid electrode fabricated from the powder and anodized at voltages of 100 volts and higher. Improved electrical leakage characteristics are obtained through a range of specific charge of up to 25,000 uFV/g.

BACKGROUND OF THE INVENTION

The performance characteristics of capacitors or electrodes formed from capacitor grade powders are expressed in terms of specific charge and electrical current leakage. The specific charge, normally expressed in uFV/g, is a measure of electrical charge capacity of the capacitor and is usually proportional to the surface area of the powder as a sintered and anodized pellet. The electrical leakage, normally expressed in units of nA/uFV or $10^{-3}$ uA/uFV, is an indication of how well the capacitor holds the specific charge. Capacitors with improved electrical leakage characteristics are recognized as having higher reliability.

It is well known that the performance characteristics of finished capacitors are affected by the chemical and physical characteristics of the powder employed to make the capacitors. Base powders having greater than 3000 ppm by weight of oxygen often develop crystalline like flaws in the dielectric film during sintering and anodic oxidation. The flaws allow current to pass through the dielectric, producing parts which exhibit excessive electrical leakage and premature failure. The likelihood of flaw formation increases for high reliability capacitors where anodization voltages of 100 volts or higher are used.

Various attempts have been made to improve the performance characteristics of finished capacitors by reacting small quantities of modifying agents to the base material powders. A range of additives or "dopants" have been used including nitrogen, silicon, phosphorous, boron, carbon and sulfur.

One example of such prior attempts is found in U.S. Pat. No. 4,154,609 which discloses the addition of an inorganic lubricant such as boron nitride to tantalum metal powder prior to sintering at 1600° C. A sintering temperature range of between 1,550° C. and 1,850° C. is disclosed. Electrical testing of sintered and anodized pellets resulted in a decrease in average electrical leakage values in a range of between 0.15 to 0.26 nA/uFV. This represents a decrease in electrical leakage of between about 4% to 38% with respect to undoped controls. Average specific charge values of between 7050 and 7635 uFV/g were also obtained.

In U.S. Pat. No. 4,544,403, tantalum base materials were doped with quantities of at least two of the additives selected from the group of carbon, sulfur, and nitrogen. Quantities of up to 1632 ppm by weight of combined dopants were used. The powder was agglomerated by heat treatment and crushed to a particle size of about −35 mesh. Sintered anodes, exhibited a decrease in averaged electrical leakage values in the range of between 24 to 28%, at an anodization voltage of 100 volts. Average specific charge values in the range of 9,564 to about 20,237 uFV/g were disclosed for the same anodization voltage. An average electrical leakage reduction of about 24 to 42% and a range of specific charge of 6,004 to 19,771 uFV/g was also disclosed for an anodization voltage of 200 volts.

Although a decrease in electrical leakage and an increase of specific charge is apparent, there is no indication of the effect of doping with nitrogen and oxygen on electrical leakage or the effect of such doping on the electrical characteristics for anodization voltages above 100 volts. Furthermore, the percentage reduction in electrical leakage is relatively low for anodization voltages above 200 volts, suggesting that the role of the dopants employed is to modify the dielectric material rather than to reduce dielectric defects during formation.

In Japanese Kokai No.: 53[1978] -49, 254, a method for forming a uniform tantalum nitride film is disclosed. In one embodiment, tantalum powder is subjected to ammonia gas and mixtures of nitrogen or ammonia with an inert gas such as argon. Alternately, tantalum powder may be exposed to a salt bath consisting of NaCN, $NaCO_3$, $BaCl_2$, and KCl. The powder is then pressed into anodes and sintered.

In Japanese Kokai No.: 63[1988]-86,509, a process for reducing electrical leakage is disclosed. Tantalum powder which was pressed into an anode and sintered was subject to an ammonia gas atmosphere at a temperature of 1,100° C. Reacted oxygen was held below 3000ppm. No disclosure is made however, of the significance of doping with both oxygen and nitrogen in the critical range claimed by the present invention.

Only marginal improvements in electrical leakage have been observed for capacitors utilized in high reliability applications. Typically these rugged capacitors are anodized at voltages above 200 volts and operate in a specific charge range of between 5,000 and 24,000 uFV/g and more particularly between 5,000 and 15,000 uFV/g.

One object of the present invention therefore is to reduce electrical leakage in solid electrolytic capacitors at formation voltages of 100 volts or higher, while maintaining specific charges above 5,000 uFV/g;

Another object of the present invention is to reduce shrinkage during sintering, thereby preserving surface area and elevated levels of specific charge associated therewith.

The development of a highly reliable solid-electrode capacitor having a specific charge of 5,000 uFV/g and greater, and electrical leakage which is improved by at least 28% over electrodes anodized at formation voltages of 100 volts or higher and having similar capacitance, would constitute a significant advance in the art of producing capacitor grade powders and products.

SUMMARY OF THE INVENTION

Accordingly, the present invention comprises a process for making low leakage capacitors from base materials containing at least one metal selected from Group V-B of the Periodic Table. The base material is reacted with a quantity of nitrogen sufficient to form at least 500 to 7000 ppm by weight nitrogen and a quantity of oxygen sufficient to form at least 700 to 3000 ppm by weight oxygen, in the material.

Electrodes are prepared by forming pellets from the nitrided and oxidized powder and sintering the pellets at temperatures between 1400° C. to 1800° C. The sintered pellets are then subject to anodization voltages of 100 volts or greater and finished into capacitors. Capacitors produced from these anodized pellets exhibit increased levels of specific charge and reduced levels of electrical leakage for anodization at voltages of about 100 volts or greater. Specific charge values of up to about 25,000 uFV/g and a reduction in leakage of 28% and greater is achieved with respect to electrodes prepared from undoped base materials.

BRIEF DESCRIPTION OF THE DRAWINGS

The invention will be more readily understood from the following description and from the accompanying non-limiting Figures.

The lower curve of FIG. 1 was prepared from data obtained by the evaluation of electrodes anodized at voltages of 150 volts and 200 volts, and was prepared in accordance with Examples 1 and 3, and 2 and 4 discussed below. The percent reduction in electrical leakage was calculated by taking the average leakage from Examples 3 and 4 over a sintering range of from about 1400° C. to 1700° C., and subtracting the value from the average leakage from control Examples 1 and 2. The percentage reduction in the average electrical leakage from the control was then calculated. The reduction is approximately 35% at 100 volt anodization, 55% at 150 volts, 60% at 200 volts, and over 80% at 400 volts.

Figure 1:
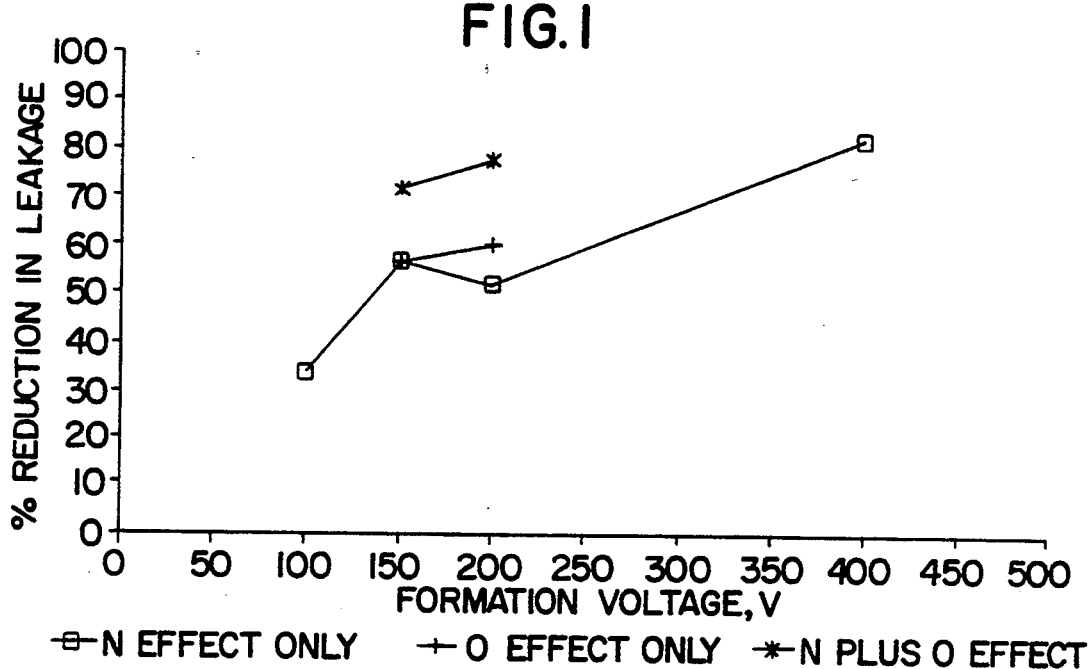
FIG. 1 illustrates the synergistic effect of reacting tantalum base material with oxygen and nitrogen together as compared with reacting the material with oxygen and nitrogen separately. Percent reduction in electrical leakage is illustrated over a range of formation voltages.

The middle curve of FIG. 1 was prepared from electrodes anodized at 100, 150, 200, and 400 volts. Comparison data was obtained from electrodes prepared in accordance with Examples 9 and 8, 2 and 1, 4 and 3, 12 and 11, and 14 and 13.

Figure 2:
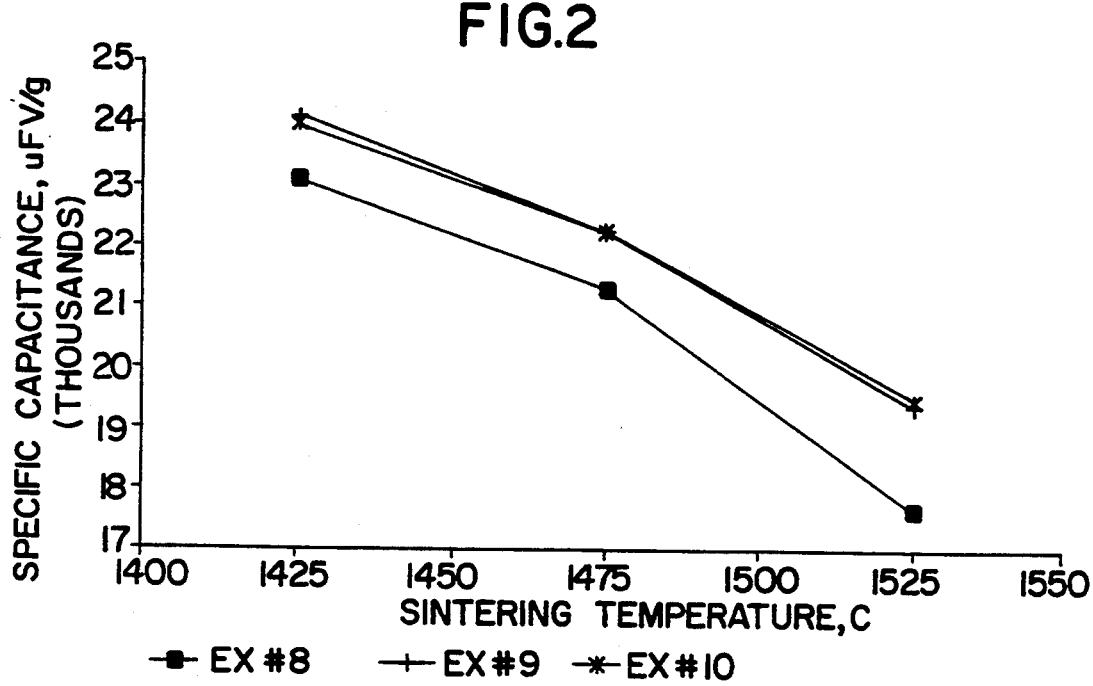
Figure 3:
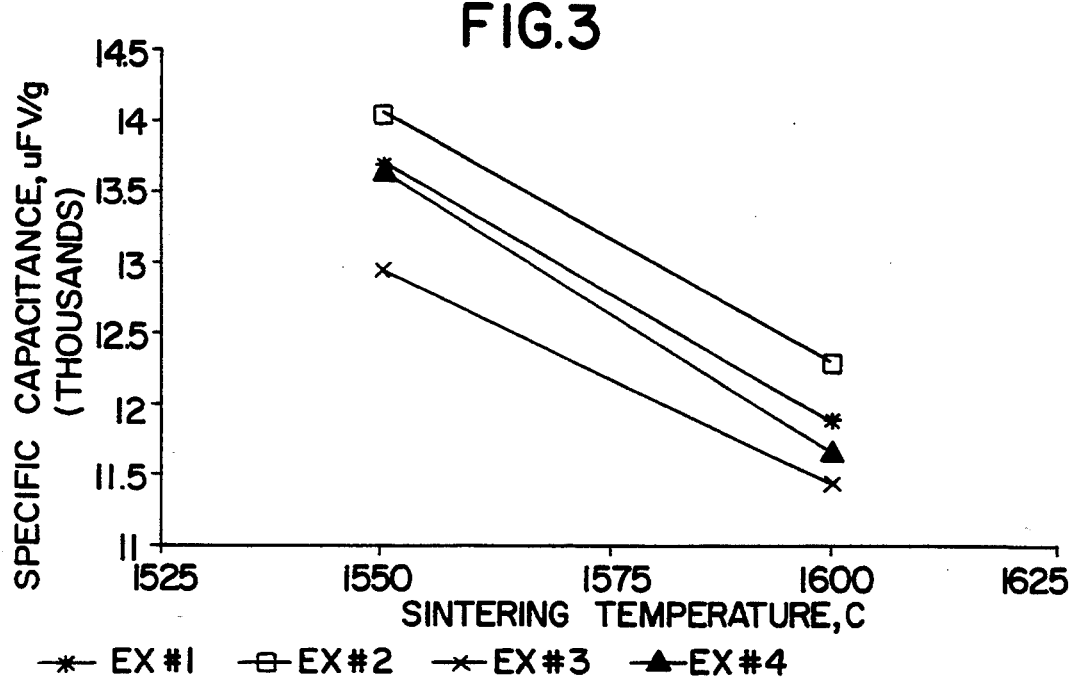

FIGS. 2 and 3 illustrate an improvement in specific charge over a range of sintering temperatures between about 1400° C. and 1600° C. Tantalum base materials were doped with oxygen and nitrogen in accordance with the process of Examples 1–4 and 8–10 respectively, and tested for specific charge. The results were compared with the results obtained from control samples prepared in accordance with the steps of Examples 1, 3 and 8. At 100 volt anodization, specific charge was increased by a range of 1000–1800 uFV/g with respect to anodes prepared without doping with nitrogen and oxygen. An improvement of about 400 to 600 uFV/g was achieved for an anodization voltage of 150 volts.

Figure 4:
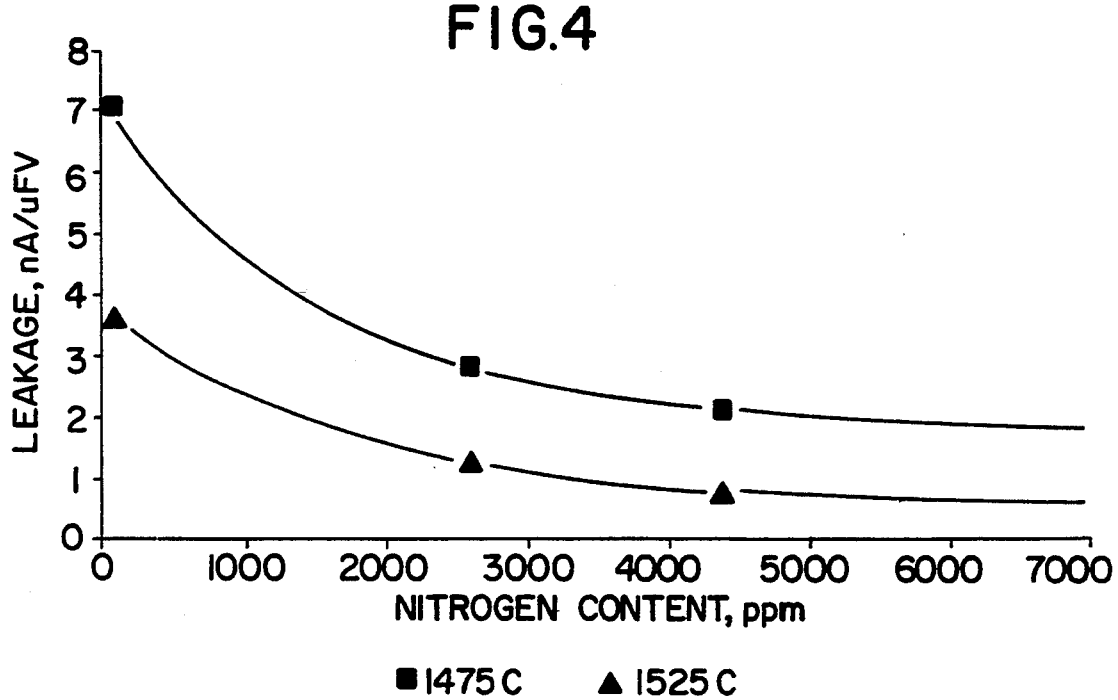

FIG. 4 illustrates a reduction of electrical leakage with increasing nitrogen content. The anodes were sintered at 1475° C. and 1525° C., and anodized at 150 volts. The degree of influence of nitrogen on the electrical leakage begins to level off at about 7000 ppm.

According to one embodiment of the present invention, capacitor powder for low leakage capacitors is produced from base materials which contain at least one metal powder selected from Group V-B of the Periodic Table. For simplicity purposes, reference shall be made to tantalum metal hereafter even though the chemical and physical properties of tantalum and niobium are known by those skilled in the art to be sufficiently similar to permit substitution of either metal.

Base materials employed in the process of the present invention are typically formed by the chemical reduction of potassium tantalum fluoride salt by metallic sodium, followed by treatment with acid, washing with water, and drying. The dried tantalum base material at this stage is called base nodular powder. In an alternate method, base materials are produced from an ingot of tantalum by hydrating the ingot, and crushing the ingot into powder of desirable sizes. The powder is further degassed in vacuum to remove hydrogen. The powder generated is called base chip powder. The base nodular and base chip powder can also be further milled to increase their surface area by fracturing the powder into a flake morphology or flake powder. For purposes of convenience, base material shall be defined hereafter to include the above recited nodular, chip, and flake morphologies and shall further include fibrous powders.

The base materials employed in one embodiment of the present invention were agglomerated by heat treatment while being subject to a vacuum or an inert gas environment. Temperatures in the range of 1200° C. to 1600° C., and preferably in the range of 1400° C. to 1500° C. were used. The heat treatment process may be repeated to achieve a desired degree of agglomeration. Those skilled in the art will recognize the thermal conditions and heating times necessary to achieve a desired level of agglomeration of the selected powder.

After agglomeration, the base material was subjected to size reduction to a screen size smaller than 40 mesh. Various traditional methods for reduction are contemplated by the present invention including the use of jaw crushing.

It is also within the scope of the present invention to prepare electrodes from powders which have not been subject to agglomeration heat treatment.

The inventor has discovered that by reacting a range of nitrogen and oxygen with the base material, capacitors produced from the treated powder demonstrated improved electrical leakage characteristics. While a range of about 500 to 7000 ppm by weight of nitrogen and of about 700 to 3000 ppm by weight of oxygen is contemplated by the present invention, a range of 1400 to 4500 ppm nitrogen and 1100 to 2900 ppm of oxygen is preferred. At anodization voltages of greater than 200 volts, ranges of 1400 to 2600 ppm nitrogen and 950 to 2900 ppm oxygen are preferred. Where the quantity of nitrogen and oxygen fall either below or above the cited range, desired reduction levels of electrical leakage and increases in specific charge are not achieved.

It is also contemplated by the present invention that nitrogen and oxygen can be added to the base material at different points during the process. For example, the dopants may be added during any heat cycle after the powder is pressed into pellets, but before the pellets are anodized. In the Examples discussed hereafter gaseous nitrogen was preferably added after agglomeration. In an alternate embodiment, oxygen was added to the base material after nitrogen addition or simultaneously therewith.

While the temperature requirement for nitrogen to react with and diffuse into tantalum metal depends on the physical state and compound used, significant reaction between nitrogen gas and tantalum metal occurs above 400° C.

In another embodiment, where ammonia gas was used, the temperature required for significant reactions to occur was above 300° C.

Although the base materials of the present invention gain oxygen after each heat cycle due to surface reaction with air under ambient condition, oxygen was removed by deoxidation with a controlling means such as an active element or compound having higher affinity for oxygen than tantalum. Various controlling means are known in the art including the use of getter materials. Preferred metals such as magnesium and/or calcium were added to the doped base material at temperatures between about 600° C. to 1100° C. while being subject to a vacuum or an inert gas environment. Temperatures at or over the melting point of the getter materials are preferred. Once deoxygenated, the tantalum powder was then cooled, and the magnesium and magnesium oxide were leached out of the powder with acids, washed with water, and dried.

In another embodiment, nitrogen was added to the base material in a deoxidation cycle. In Examples 6 and 7, discussed in detail below, about 1850 to 2550 ppm of nitrogen were reacted with the base material as magnesium nitride. In the reaction that followed, magnesium nitride exchanged nitrogen for the oxygen from tantalum as shown below:

$$TaO_x + y(Mg_3N_2) \rightarrow TaN_z + x(MgO)$$

Those skilled in the art will recognize that the values of x, y, and z will depend on the level of oxygen and nitrogen present in the tantalum base material. In accordance with Examples 6 and 7, between about 2050 and 2900 ppm of oxygen by weight remained after the powder was purified of magnesium oxide. A reduction in electrical leakage of between 75 and 84% and a specific charge range of 9,800 to about 15,350 was obtained for an anodization voltage of 150 to 200 volts. Desired quantities of both oxygen and nitrogen were reacted with base metal in the same step.

Where at least a stoichiometric amount of magnesium is used and appropriate temperatures and residence times known to those skilled in the art are employed, oxygen in the tantalum metal lattice can be completely removed. Tantalum rapidly forms tantalum oxide as a surface layer upon exposure to an oxygen environment (e.g. air). Therefore, the oxygen content in the tantalum metal powder under this circumstance is proportional to the surface area.

In an alternate embodiment, the oxygen content was also controlled by varying the amount of hydrofluoric (HF) acid used in the leaching process. HF dissolves tantalum surface oxide thereby reducing the surface area of tantalum and the associated oxygen content. In yet a further embodiment, oxygen content was adjusted by varying the time and temperature during drying in air after acid and water leaching.

The nitrided and oxygenated tantalum material having a BET of less than 0.6 m²/g and preferably between 0.25 and 0.55 m²/g was then pressed into a pellet, sintered, and evaluated for electrical leakage characteristics in accordance with the procedures identified below. These procedures are generally known and recited in U.S. Pat. Nos. 4,441,927 and 4,722,756, currently assigned to the present assignee Cabot Corporation. Alternate methods for conducting physical, chemical, and electrical analysis are known in the art.

The electrodes were then finished into capacitors by forming a dielectric layer of tantalum pentoxide on the surface of the sintered anodes. The pentoxide layer formed as a result of the anodic oxidation of the anodes' exposed tantalum metal with phosphoric acid. Other dilute acid solutions known in the art may be used including aqueous sulfuric acid, and nitric acid solutions.

After drying, the electrodes were immersed in a solution of manganese nitrate. The solution impregnated electrodes were then heated to a temperature sufficient to decompose the manganese nitrate to manganese dioxide. The manganese dioxide formed a uniform layer adjacent the tantalum pentoxide layer. The layer of manganese dioxide functioned as the cathode. A layer of graphite was then applied adjacent to the manganese dioxide layer prior to connecting terminal leads to the electrodes to form the finished capacitors.

While not wishing to be limited by any particular theory, it is believed that the synergistic effect of reacting quantities of nitrogen and oxygen with a base material results in the formation of a more stable dielectric layer of tantalum pentoxide. Generally, a desirable tantalum oxide dielectric is amorphous. In the anodization process, crystal tantalum pentoxide can form as a result of the presence of impurities such as Fe, Cr, Ni, Zr, C. A suitable quantity of amorphous tantalum oxide or nitride is needed to minimize growth of crystal tantalum oxide around the impurity sites during the anodization process. This is especially important at a high formation voltage of, for example, 100 volts or higher, since the electrical field generated at high voltages enhances crystal growth. Crystalline structures exhibit higher electrical conductivity and therefore results in high current leakage.

With excessively high oxygen content in the powder (e.g. over 3500 ppm), the oxygen tends to form crystalline tantalum oxide after pressing, sintering, and cooling. The tantalum oxide crystal formed before anodization acts like an impurity which serves as a site for crystal formation of tantalum oxide during sintering. Therefore, there is an optimal oxygen concentration in the powder. The optimal level is generally in the range of between 700 and 3000 ppm depending in part on the available surface area and the sintering and formation conditions.

The behavior and effects of nitrogen in the sintering and anodization processes of tantalum metal are similar to those of oxygen, except for the fact that solubility of nitrogen is about twice as high as that of oxygen in tantalum at a given temperature. Therefore, higher nitrogen content in the powder can result in lower electrical leakage in the capacitor. Furthermore, at normal capacitor application temperatures (ambient to 100° C.), nitrogen as tantalum nitride, having a high density and low mobility in the tantalum matrix, tends to limit movement of oxygen with respect to the dielectric layer. This can prevent the formation of a sub-oxide which would have a higher electrical leakage than the amorphous tantalum pentoxide layer.

Tantalum oxide is more resistant to sintering than tantalum metal within the normal temperature range. A higher oxygen content in tantalum powder preserves surface area during sintering and results in higher capacitance. The addition of nitrogen to tantalum powder has similar effects, in that surface area is preserved during sintering and specific charge is increased.

Not withstanding the advantages of doping with nitrogen or oxygen separately, the inventor has discovered that the reaction of a limited range of oxygen and nitrogen with the tantalum base material results in a synergistic effect which both improves the electrical leakage characteristics and increases the specific charge of finished capacitors to levels unachievable by the addition of either dopant alone.

Referring to the data in Tables 1-3 below, and FIG. 1, an improvement in electrical leakage of greater than 30% was realized over an anodization range of 100 to 200 volts where 1400 to 4400 ppm of nitrogen and 1100 to 2900 ppm by weight of oxygen was reacted with tantalum base material. A range of specific charge of between about 9,400 and 24,100 uFV/g was also obtained. The percent reduction in electrical leakage was calculated by comparing averaged leakage values over a sintering temperature range of about 1400° C. to 1700° C. In particular, a comparison was made of control Example 8 with Examples 9 and 10 for anodization at 100 and 150 volts; control Example 1 with Example 2; and control Example 3 with Examples 4-7 for 200 volts.

For a range of anodization voltage of from 150 to 400 volts, an improvement in electrical leakage of greater than 36% was achieved for a specific charge range of about 5,100 to about 18,000 uFV/g. Quantities of between 1400 and 4450 ppm by weight nitrogen and between 950 and 2900 ppm by weight oxygen were reacted with tantalum base material. Percent reduction in electrical leakage was calculated in the manner discussed above on the basis of a comparison of control Example 8 with Examples 9 and 10 at 150 volt anodization. Control Examples 11 and 13 were compared with Examples 12 and 14 at 400 volt anodization.

In yet a further embodiment, quantities of between about 1400 to 2600 ppm by weight nitrogen and between 950 to 2900 ppm by weight oxygen were reacted with tantalum base material. A decrease in electrical leakage of between about 52 to 99% and a range of specific charge of 5,500 to 13,200 was achieved at anodization levels of about 200 to 400 volts. The percent decrease in electrical leakage for electrodes was calculated in the manner discussed above for 200 and 400 volt anodization levels.

The following Examples are provided to further clarify the invention and demonstrate the improvements over previous processes for making capacitor grade powder. Those skilled in the art will recognize that the Examples are for illustrative purposes and not for limiting the scope of the invention.

EXAMPLE 1

Over 500 lbs of a base nodular powder was heat treated under vacuum at 1500° C., and crushed down to −40 mesh (hereafter referred to as HTA in the subsequent Examples). 60 lbs of the HTA powder was then blended with 0.9 lbs of magnesium. The blend was placed in a retort, and sealed from the atmosphere. The sealed retort was evacuated with vacuum pump, heated up to 900° C. for a period of 3 hours, and cooled to ambient temperature. The powder taken out of the retort was leached with nitric acid and rinsed with water to remove the residual magnesium and magnesium oxide before being air dried at 100° C. for 6 hours. The powder was further dried at 180° C. for 8 hours.

A sample of this powder was measured for its surface area via a BET method, and oxygen and nitrogen by the procedure discussed below. The results are listed in Table 1.

PROCEDURE FOR CAPACITANCE, ELECTRICAL LEAKAGE, DETERMINATION (A) Pellet Fabrication:

The powder was compressed in a commercial pellet press without the aid of binders. Typically, the pressed density was 5 and 7 g/cc using a powder weight of 16 mg to 100 mg, and a diameter of 1.25 mm to 2.5 mm.

(B) Vacuum Sintering

The compacted pellets were sintered in a high vacuum of less than $10^{-3}$ torr (0.00133 Pa) for 30 minutes (1800 seconds) at a temperature between about 1400° C. to 1800° C.

(C) Anodization

The sintered pellets were anodized in a forming bath at 90°±2° C. at between 100 and 400 volts DC. The electrolyte was 0.1% phosphoric acid.

The anodization rate was controlled to 1 volt per minute. After the desired anodization voltage (preferably either 100, 150, 200, or 400 volts) was reached, the anode was held at the voltage for a period for three hours. The anode was then washed and dried.

(D) Testing Conditions

The anodes, after anodizing, rinsing, and drying, were first tested for electrical leakage. A 10% phosphoric acid test solution was employed. The anodes were immersed in the test solution to the top of the anode and a voltage of 70% of the final formation voltage (i.e. 70 volts if anodized at 100 volts) was applied for 10 seconds to 2 minutes after which the electrical leakage was measured.

After the electrical leakage measurements were completed, the specific charge was measured on the anode employing a type 1611B General Radio Capacitance Test Bridge.

Oxygen and Nitrogen Analysis

The oxygen and nitrogen analysis was made using the Leco TC-30 $O_2$ and $N_2$ analyzer which is an inert gas fusion technique.

BET Surface Area

The total surface area of the tantalum was measured using a Numinco Orr surface area pore volume analyzer (manufactured by Numec Corporation). The BET (Braunauer-Emmet-Teller) surface areas obtained in this manner include the external surface area as well as the internal surface area contributed by the presence of the pores.

TABLE 1

|  | EX 1 | EX 2 | EX 3 | EX 4 | EX 5 | EX 6 | EX 7 |
|---|---|---|---|---|---|---|---|
| Oxygen, ppm | 2150 | 2095 | 1360 | 1105 | 2220 | 2095 | 2860 |
| Nitrogen, ppm | 45 | 1510 | 55 | 1665 | 1440 | 1860 | 2540 |
| BET, m²/g | 0.35 | 0.34 |  | 0.35 | 0.34 |  | 0.36 |
| CAPACITANCE |  |  |  |  |  |  |  |
| 150 V anodization |  |  |  |  |  |  |  |
| 1550 C. sinter | 13700 | 14080 | 12950 | 13660 | 15380 | 15020 | 15290 |
| 1600 C. sinter | 11900 | 12295 | 11435 | 11665 | 13700 | 13130 | 13590 |
| 1650 C. sinter | 10460 |  |  | 11120 | 10940 | 11240 |  |
| 200 V anodization |  |  |  |  |  |  |  |
| 1550 C. sinter | 11700 | 12016 | 11215 | 11860 | 13190 | 12650 | 13050 |

TABLE 1-continued

|  | EX 1 | EX 2 | EX 3 | EX 4 | EX 5 | EX 6 | EX 7 |
|---|---|---|---|---|---|---|---|
| 1600 C. sinter | 10200 | 10740 | 9970 | 10542 | 12020 | 11530 | 11880 |
| 1650 C. sinter |  | 9490 |  |  | 10410 | 9850 | 10130 |
| CURRENT LEAKAGE |  |  |  |  |  |  |  |
| 150 V anodization |  |  |  |  |  |  |  |
| 1550 C. sinter | 0.60 | 0.38 | 1.23 | 0.68 | 0.48 | 0.50 | 0.41 |
| 1600 C. sinter | 0.37 | 0.26 | 1.01 | 0.52 | 0.31 | 0.37 | 0.23 |
| 1650 C. sinter |  | 0.21 |  |  | 0.24 | 0.24 | 0.19 |
| 200 V anodization |  |  |  |  |  |  |  |
| 1550 C. sinter | 3.43 | 1.92 | 7.74 | 3.89 | 2.23 | 2.20 | 1.85 |
| 1600 C. sinter | 1.95 | 1.09 | 5.56 | 2.56 | 1.32 | 1.49 | 0.77 |
| 1650 C. sinter |  | 0.66 |  |  | 0.74 | 0.71 | 0.58 |

EXAMPLE 2

55 lb of heat treated nodular powder from the same batch as in Example 1 (HTA) was deoxidized using the same procedure as that described in Example 1, except that during the cooling process, a quantity of nitrogen was introduced into the retort at a temperature of 400° C. After the addition was completed, the retort and powder were then allowed to continue to cool. The powder was leached, dried and tested in accordance with the procedure of Example 1.

EXAMPLE 3

The base powder of Example 1 was heat treated at 1500° C., and deoxidized.

EXAMPLE 4

The base powder of Example 1 was heat treated, deoxidized, and reacted with nitrogen in accordance with the procedure of Example 2. The procedure for acid leaching, water rinsing, and drying employed in Example 3 were utilized.

EXAMPLE 5

120 lbs of base nodular powder was heat treated at 1500° C. and crushed to an average particle size of −40 mesh. The powder was then mixed with 1.8 lb of magnesium and sealed in a retort. The retort was then evacuated with a mechanical pump and heated to the reaction temperature as described in Example 1. After reaction, 1500 ppm by weight of nitrogen gas was introduced into the powder retort when the powder was cooled to a temperature of 500° C. The powder and the retort were then cooled to ambient temperature. The cooled powder was acid leached, rinsed with water, and dried using the same procedure as that used in Example 1.

EXAMPLE 6

300 grams of the heat treated powder from the batch described in Example 1 were mixed with 3.2 grams of magnesium nitride and 2.2 grams of magnesium. The blended powder was held in a tantalum metal tray which is placed in a retort, and deoxidized. The deoxidized powder was then leached and dried in accordance with the procedure described in Example 1.

EXAMPLE 7

300 grams of the heat treated powder from the batch described in Example 1 were mixed with 5.4 grams of magnesium nitride and 0.6 grams of magnesium. The blended powder was held in a tantalum tray which was placed in a retort, and deoxidized. The powder was removed and subject to leaching and drying using the same procedure as that described in Example 1.

EXAMPLE 8

A high surface area powder, having an average mean particle size of about 1μ was heat treated at 1400° C. and crushed down to −40 mesh. About 5 lb of the heat treated powder was mixed with 30 grams of magnesium. The blended powder was placed in a tantalum tray which in turn was sealed inside a retort. The sealed retorted was evacuated with a mechanical pump, heated up to 950° C. for a period of 3 hours and then cooled to ambient temperature. The powder was then taken out of the retort and leached, rinsed, and dried in the manner discussed above to remove the residue magnesium and magnesium oxide.

EXAMPLE 9

The same high surface area powder utilized in Example 8 was heat treated, deoxidized, leached, and dried in accordance with the procedures of Example 8. About 5 lbs. of the dried tantalum base material was introduced into a retort and heated to a temperature of 500° C. About 3.5 grams of nitrogen gas was introduced into the retort during the cooling process.

EXAMPLE 10

The same high surface area powder was heat treated, deoxidized, leached, and dried as described in Example 8. About 5 lbs of dried tantalum base material was introduced into a retort and heated to 500° C. About 13 grams of nitrogen gas was introduced into the retort during the cooling process.

The results of Examples 8 through 10 are found below in Table 2.

TABLE 2

|  | EX 8 | EX 9 | EX 10 |
|---|---|---|---|
| Oxygen, ppm | 2440 | 1922 | 1900 |
| Nitrogen, ppm | 85 | 2572 | 4365 |
| BET, m$^2$/g | 0.53 | 0.44 | 0.44 |
| CAPACITANCE |  |  |  |
| 100 V anodization |  |  |  |
| 1425 C. sinter | 23090 | 24100 | 23950 |
| 1475 C. sinter | 21285 | 22255 | 22265 |
| 1525 C. sinter | 17651 | 19381 | 19510 |
| 150 V anodization |  |  |  |
| 1425 C. sinter | B.D. | 17930 | 17510 |
| 1475 C. sinter | 16160 | 17835 | 17790 |
| 1525 C. sinter | 14195 | 15745 | 15985 |
| CURRENT LEAKAGE |  |  |  |
| 100 V anodization |  |  |  |
| 1425 C. sinter | 1.28 | 0.53 | 0.90 |
| 1475 C. sinter | 0.50 | 0.33 | 0.33 |

TABLE 2-continued

|  | EX 8 | EX 9 | EX 10 |
| --- | --- | --- | --- |
| 1525 C. sinter 150 V anodization | 0.29 | 0.22 | 0.22 |
| 1425 C. sinter | B.D. | 6.08 | 5.85 |
| 1475 C. sinter | 7.07 | 2.84 | 2.16 |
| 1525 C. sinter | 3.61 | 1.28 | 0.77 |

Note: "B.D." is defined as the failure point or point of break down of the anode dielectric before the anodization voltage of 150 V was reached. The capacitance and leakage can not be measured under this condition.

EXAMPLE 11

A chip powder was milled into a flake powder by mechanical means for 2 hours. The milled flake was acid leached and rinsed with water to remove surface impurity, followed by drying. The dried flake was then hydrided, and milled into smaller pieces of flake. The milled powder was then heat treated twice. The first heat treatment step was conducted at 1375° C. for 30 minutes under vacuum in a vacuum inductance (VI) furnace. The powder was then crushed and screened to less than ±40 mesh, and heat treated again at 1475° C. for 30 minutes under vacuum in a VI furnace. The twice heat treated powder was again, crushed and screened to −40 mesh.

The heat treated flake powder was then deoxidized, acid leached, water rinsed, and dried using the procedure described in Example 1.

About 16 mg of the tantalum base material sample was then pressed into a pellet with a 7.0 g/ml density and sintered at 1700° C. for 30 minutes. The pellets were then anodized at 400 volts and tested for specific charge and electrical leakage at 70% of the anodization voltage, i.e. 280 V. Results for Examples 11 through 14 are found in Table 3 below.

EXAMPLE 12

The twice heat treated powder, described in Example 11, was deoxidized, nitrided, acid leached, water rinsed, dried and tested using the procedure of Example 11.

EXAMPLE 13

The twice heat treated powder, described in Example 11, was deoxidized using the same procedure as that used in Example 11, except that the dried powder was dried a second time at 185° C. for 6 hours.

EXAMPLE 14

The twice heat treated powder, described in Example 11, was deoxidized and nitrided using the procedure discussed in Example 12, except that the dried powder was dried a second time at 185° C. for 6 hours.

TABLE 3

|  | EX 11 | EX 12 | EX 13 | EX 14 |
| --- | --- | --- | --- | --- |
| Oxygen, ppm | 979 | 976 | 1151 | 1333 |
| Nitrogen, ppm | 109 | 1852 | 140 | 1906 |
| BET, m²/g | 0.27 | 0.29 | 0.27 | 0.29 |
| CAPACITANCE ($\mu$F-V/g) 400 V anodization |  |  |  |  |
| 1700 C. sinter | 5207 | 5533 | 5186 | 5622 |
| CURRENT LEAKAGE (nA/$\mu$F-V) 400 V anodization |  |  |  |  |
| 1700 C. sinter | 0.98 | 0.34 | 25.09 | 0.34 |

I claim:

1. A process for making low leakage capacitors from a base material containing at least one metal powder selected from Group V-B, comprising:
   reacting a quantity of nitrogen with said base material to form at least 500 to 7000 ppm by weight of nitrogen in said material,
   reacting a quantity of oxygen with said base material sufficient to form at least 700 to 3000 ppm by weight of oxygen in said material,
   forming pellets from said base material and sintering said pellets at temperatures between 1400° C. to 1800° C.,
   subjecting said sintered pellets to anodization voltages of 100 volts or greater,
   forming capacitors from said anodized pellets, and detecting a specific charge of up to about 25,000 uFV/g and improved electrical leakage characteristics.

2. A process in accordance with claim 1 wherein said base material contains at least tantalum metal powder.

3. A process in accordance with claim 2 wherein said base material comprises nodular, chip, fiber, and flake powders.

4. A process in accordance with claim 3 wherein said base material is agglomerated at a temperature between about 1200° C. to 1600° C.

5. A process in accordance with claim 4 wherein said base material is agglomerated at a temperature between about 1400° C. to 1500° C.

6. A process in accordance with claim 4 wherein said agglomerated material is reduced in size to a powder having a particle size of −40 mesh.

7. A process in accordance with claim 3 wherein said quantity of nitrogen is reacted as nitrogen gas.

8. A process in accordance with claim 3 wherein said quantity of nitrogen is reacted as ammonia gas.

9. A process in accordance with claim 3 wherein said quantity of nitrogen is reacted as magnesium nitride.

10. A process in accordance with claim 3 wherein said quantity of nitrogen and oxygen are added in the same step.

11. A process in accordance with claim 3 wherein said quantity of oxygen in said base material is limited by a controlling means.

12. A process in accordance with claim 11 wherein said controlling means comprises the addition of quantities of hydrofluoric acid to said base material.

13. A process in accordance with claim 11 wherein said controlling means comprises a getter material having a higher affinity for oxygen than tantalum.

14. A process in accordance with claim 13 wherein said getter material is magnesium.

15. A process in accordance with claim 1 wherein said electrical leakage is reduced by greater than 28% with respect to capacitors formed from said base material.

16. A process in accordance with claim 1 wherein said quantity of nitrogen reacted is between 1400 and 4400 ppm by weight of nitrogen and said quantity of oxygen is between 1100 and 2900 ppm.

17. A process in accordance with claim 16 wherein said electrical leakage, for anodization voltages of 100 to 200 volts and specific charges from about 9400 to about 24,100 uFV/g, is reduced by greater than 30% with respect to capacitors prepared from said base material.

18. A process in accordance with claim 1 wherein said quantity of nitrogen reacted is between 1400 and 4400 ppm by weight of nitrogen and said quantity of oxygen is between 950 and 2900 ppm by weight of oxygen.

19. A process in accordance with claim 18 wherein said electrical leakage, for at anodization voltages of 150 to 400 volts and specific charges from about 5,100 to about 18,000 uFV/g, is reduced by greater than 36% with respect to capacitors prepared from said base material.

20. A process in accordance with claim 1 wherein said quantity of nitrogen reacted is between 1400 and 2600 ppm by weight of nitrogen and said quantity of oxygen is between 950 and 2900 ppm by weight of oxygen.

21. A process in accordance with claim 20 wherein said electrical leakage, for at anodization voltages of 200 to 400 volts and specific charges from about 5,500 to about 13,200 uFV/g, is reduced by between about 52 and 99% with respect to capacitors prepared from said base material.

22. A process making low leakage capacitors from a base material containing at least tantalum metal powder comprising:
- subjecting said material to a temperature of between about 1200° C. and 1600° C. and forming agglomerates of said material,
- reacting a quantity of nitrogen with said agglomerated material sufficient to form between 1400 to 4400 ppm by weight of nitrogen in said material,
- reacting a quantity of oxygen with said agglomerated material sufficient to form between at least 700 to 3000 ppm by weight of oxygen in said material,
- reacting a quantity of a reducing metal with oxygen present in said reacted material and forming a quantity of metal oxide,
- controlling said quantity of metal oxide to a level of between about 950 ppm to 2900 ppm by weight of oxygen in said material,
- forming pellets from said reacted material and sintering said pellets at temperatures between about 1400° C. to 1800° C., subjecting said sintered pellets to anodization voltages of between 150 and 400 volts, and
- forming capacitors from said anodized pellets having a specific charge of between about 5,100 to about 18,000 uFV/g and electrical leakage which is reduced by greater than 36% with respect to capacitors prepared from said base material.

23. A process in accordance with claim 22 wherein said quantity of nitrogen is reacted as nitrogen gas.

24. A process in accordance with claim 22 wherein said quantity of nitrogen is reacted as magnesium nitride.

25. A process in accordance with claim 22 wherein said quantity of nitrogen is reacted as ammonia gas.

26. A process in accordance with claim 22 wherein said reducing metal is magnesium.

27. A process in accordance with claim 22 wherein said quantity of nitrogen reacted is between 1400 and 2600 ppm by weight of nitrogen and said quantity of oxygen is between 950 and 2900 ppm by weight of oxygen.

28. A process in accordance with claim 27 wherein said electrical leakage, for anodization voltages of 200 to 400 volts and specific charges from about 5,500 to about 13,200 uFV/g, is reduced by between about 52 and 99% with respect to capacitors prepared from said base material.

29. A process for making low leakage capacitors from a base material containing at least tantalum metal powder comprising:
- subjecting said material to a temperature of between about 1400° C. and 1500° C. and forming agglomerates of said base material,
- reducing said agglomerates to a powder having a screen size of −40 mesh,
- reacting a quantity of magnesium nitride and a quantity of magnesium metal with said powder and forming 1850 to 2550 ppm by weight of nitrogen in said powder,
- reacting said magnesium metal with oxygen in said powder to form a magnesium oxide component,
- removing said oxide to a level of between about 2050 to about 2900 ppm by weight of oxygen in said powder,
- forming pellets from said deoxygenated powder and sintering said pellets at temperatures between about 1550° C. to 1650° C.,
- subjecting said sintered pellets to anodization voltages of between 150 and 200 volts, and
- forming electrodes from said anodized pellets having a specific charge of between about 9,800 to about 15,300 uFV/g and electrical leakage which is reduced by between about 75% to 84% with respect to capacitors prepared from said base material.

30. A tantalum powder for the manufacture of solid capacitors having high specific charge and low electrical leakage characteristics comprising:
- a BET of less than about 0.6 m$^2$/g,
- an average agglomerated particle size of −40 mesh,
- a quantity of nitrogen in the range of about 500 ppm to 7000 ppm by weight nitrogen, and
- a quantity of oxygen in the range of about 700 ppm to 3000 ppm by weight of oxygen.

31. A powder in accordance with claim 30 where said powder has a BET value of between about 0.25 and about 0.55 m$^2$/g.

32. A powder in accordance with claim 30 wherein said quantity of nitrogen reacted is between 1400 and 4400 ppm by weight of nitrogen and said quantity of oxygen is between 950 and 2900 ppm by weight of oxygen.

33. A capacitor produced from the powder of claim 32 wherein said electrical leakage, for anodization voltages of 150 to 400 volts and specific charges from about 5,100 to 18,000 uFV/g, is reduced by greater than 36% with respect to capacitors prepared from said base material.

34. A capacitor having low electrical leakage characteristics comprising:
- a sintered anode produced from tantalum base material, pressed into a pellet, and sintered at temperatures between 1400° C. and 1800° C.,
- said base material having between 500 to 7000 ppm by weight of nitrogen and between 700 to 3000 ppm by weight of oxygen,
- a layer of anodic tantalum pentoxide formed on the surface of said sintered anode,
- a layer of manganese dioxide adjacent to said tantalum pentoxide,
- a layer of graphite positioned adjacent said manganese dioxide layer,
- an exterior shell in electrical contact with said graphite layer, and conductive contacts fixed to said shell.

35. A capacitor in accordance with claim 31 wherein said tantalum base material is selected from the group consisting of nodular, chip, fiber and flake powders.

36. A capacitor in accordance with claim 31 wherein said quantity of nitrogen reacted is between 1400 and 2600 ppm by weight of nitrogen and said quantity of oxygen is between 950 and 2900 ppm by weight of oxygen.

37. A capacitor in accordance with claim 33 wherein said electrical leakage is greater than between about 52% to 99% for anodization voltages of 200 to 400 volts.

38. A capacitor in accordance with claim 34 which exhibits a specific charge of between 5,500 and 13,200 uFV/g for sintering temperatures of 1400° C. to 1700° C.

* * * * *